(12) United States Patent
Böckmann et al.

(10) Patent No.: US 6,411,877 B2
(45) Date of Patent: Jun. 25, 2002

(54) AUTOMOBILE MULTIFUNCTIONAL DISPLAY AND CONTROL DEVICE METHOD

(75) Inventors: Ingo Böckmann, Ribbesbüttel; Ebert Holger, Nürnberg; Heimermann Matthias, Wolfenbüttek, all of (DE)

(73) Assignee: Volkswagen AG (DE)

( * ) Notice: Subject to any disclaimer, the term of this patent is extended or adjusted under 35 U.S.C. 154(b) by 0 days.

(21) Appl. No.: 09/841,628

(22) Filed: Apr. 24, 2001

Related U.S. Application Data

(63) Continuation of application No. PCT/EP99/07637, filed on Oct. 12, 1999.

(30) Foreign Application Priority Data

| Oct. 15, 1998 | (DE) | 198 47 610 |
| Jun. 16, 1999 | (DE) | 199 27 465 |
| Sep. 3, 1999 | (DE) | 199 41 969 |

(51) Int. Cl.[7] .............................................. B60R 16/02
(52) U.S. Cl. ............................................ 701/48; 701/36
(58) Field of Search ............................... 701/48, 36, 49, 701/27, 24, 200; 369/6, 10

(56) References Cited

U.S. PATENT DOCUMENTS

| 4,586,035 A | 4/1986 | Baker et al. ............... 340/712 |
| 4,731,769 A | 3/1988 | Schaefer et al. ............... 369/6 |
| 5,539,429 A | 7/1996 | Yano et al. ............... 345/173 |

FOREIGN PATENT DOCUMENTS

| DE | 3628333 | 3/1988 |
| DE | 4010025 | 6/1991 |
| DE | 4033832 | 6/1991 |
| DE | 4017895 | 11/1991 |
| DE | 4041193 | 7/1992 |
| DE | 4307367 | 9/1994 |
| DE | 4338171 | 4/1995 |
| DE | 19507997 | 9/1996 |
| DE | 19609589 | 9/1997 |
| DE | 29710675 | 9/1997 |
| DE | 19702957 | 8/1998 |
| DE | 19807410 | 8/1999 |
| DE | 19827753 | 12/1999 |
| EP | 0366132 | 5/1990 |
| EP | 0437993 | 7/1991 |
| EP | 0461360 | 12/1991 |
| EP | 0701926 | 3/1996 |
| EP | 0795807 | 9/1997 |
| EP | 0816155 | 1/1998 |
| WO | 9713657 | 4/1997 |
| WO | 9809846 | 3/1998 |

*Primary Examiner*—Richard M. Camby
(74) *Attorney, Agent, or Firm*—Baker Botts LLP

(57) ABSTRACT

A display and control system is arranged to control multiple devices in a motor vehicle. The display includes an information display portion and a function display portion arranged adjacent to variable function control elements arranged near the periphery of the display.

20 Claims, 6 Drawing Sheets

AUTOMOBILE MULTIFUNCTIONAL DISPLAY AND CONTROL DEVICE METHOD

This application is a Continuation of Application PCT/EP99/07637 filed Oct. 12, 1999, which was published in German.

BACKGROUND OF INVENTION

The invention relates to a multifunctional display and control device for a motor vehicle, and the use of such a device.

Because of the use of more luxury features in automobiles, each requiring controls, multifunctional control devices are being employed. In such devices, after selection of a feature or a menu, the respective control function for the feature is assigned to the device, and functions corresponding to the selected menu or a menu function are represented on a display.

A multifunctional control device for a motor vehicle is disclosed in European patent EP 366,132 B1, wherein a single bidirectional rotary switch having an axial motion is used for selecting function groups and setting them, by means of the Enter function, and then selecting the appropriate function from the respective function group in the same way. However, particularly with a large number of regulating or supplementary features to be controlled, manipulating only one single control element for function groups as well as for individual functions may permit errors in selection to occur, and due to concentration on the control surface the operator may be distracted from what is going on around him. In addition, a return function is only possible by multiple actuations of the rotary switch, turning to an additional field of the control surface and actuation of the Enter key.

A multifunctional control device is likewise described in German Patent DE 35 14 438, which has a display beside which there are arranged control elements to which functions are assigned, which control the selection of supplementary devices to be controlled, as well as a menu or a function of the supplementary device. The assigned supplementary device, menu or function is shown clearly to the user on the display.

In addition, WO 98/09846 discloses a generic multifunctional display and control device wherein a variety of actuating elements are provided for selection of the devices to be controlled and control of the functions of the individual devices. There the actuating elements for the individual functions are arranged independent of the display device and are designed for example as shaft encoders/pressure transducers or rocker switches, by means of which the functions represented on the display device can be selected on or off.

Additionally, European patent application EP 701,926 A2 discloses a multifunctional control device wherein only the selection of individual functions subordinate to particular function groups is effected by means of a bidirectional rotary switch. Additional control elements assigned to the respective function groups, without double or multiple assignment, are provided for the selection of specific function groups. Since there is no double assignment of control elements for access to primary function groups (menus), maintenance of the clear arrangement of control elements makes it possible for even inexperienced persons to work with the multifunctional control device without being distracted from what is going on around them.

The object of the invention is to provide a multifunctional display and control device that is easy to use and provides an improved display of the selected menu and/or function assignment, and can be used by inexperienced operators, as well as a method for operating such a display and control device.

SUMMARY OF THE INVENTION

According to the invention, a variety of menus and/or functions are assigned to control elements on the basis of selected menu and/or function levels, while within a menu or function level, a menu or a function is permanently assigned to the respective control elements. The display is designed in several parts, one part of the display field representing an information panel on which is presented information pertaining to the selected menu or function and optionally, important information pertaining to other function groups. Function and/or status displays are generated clearly on the remaining part of the display field in such a way that they are each assigned to a control element, which has been assigned to control the respective function in this selection menu.

According to a refinement of the invention, one of the functions displayed in the remaining display field and assigned to a control elements is a function for return to a superior menu.

For improved discrimination between information that is presented on the information panel and function and status displays, the display presentation is effected virtually three-dimensionally so that the information panel presentation contrasts with function and/or status displays by visual depth.

In addition, at least one of the function and/or status displays may be positioned in functional and/or spatial relationship with a corresponding display in the information panel.

A preferred refinement of the invention further provides that selected and/or selectable functions and/or status displays are visually highlighted. For example an apparent cone of light, which has its optical origin, i.e., the point of its highest light density, near the corresponding assigned control element, may be used.

In another embodiment of the invention the information panel and the rest of the display field is shown clearly displayed with a function-and status-link using a variation in display characteristics, such as color, brightness, contrast and size.

In addition to the control elements to which control functions are assigned according to the selected menu, or selected function, and whose respective applicable control function is shown clearly on a portion of the display field, additional control elements may also be provided. In one embodiment this is a bidirectional rotary knob, by means of which further additional functions, as well as the control functions that are already selectable with existing control elements, are controllable.

The multifunctional display and control device according to the invention may be used for a wide variety of devices in a motor vehicle. These may be luxury features such as navigation devices, audio and television sets, on-board computers and entertainment devices. The invention may also be used for adjusting motor vehicle components and for control and display of diagnostic devices of the vehicle.

The invention is described below in detail by way of examples.

DETAILED DESCRIPTION OF DRAWINGS

Figure 1:
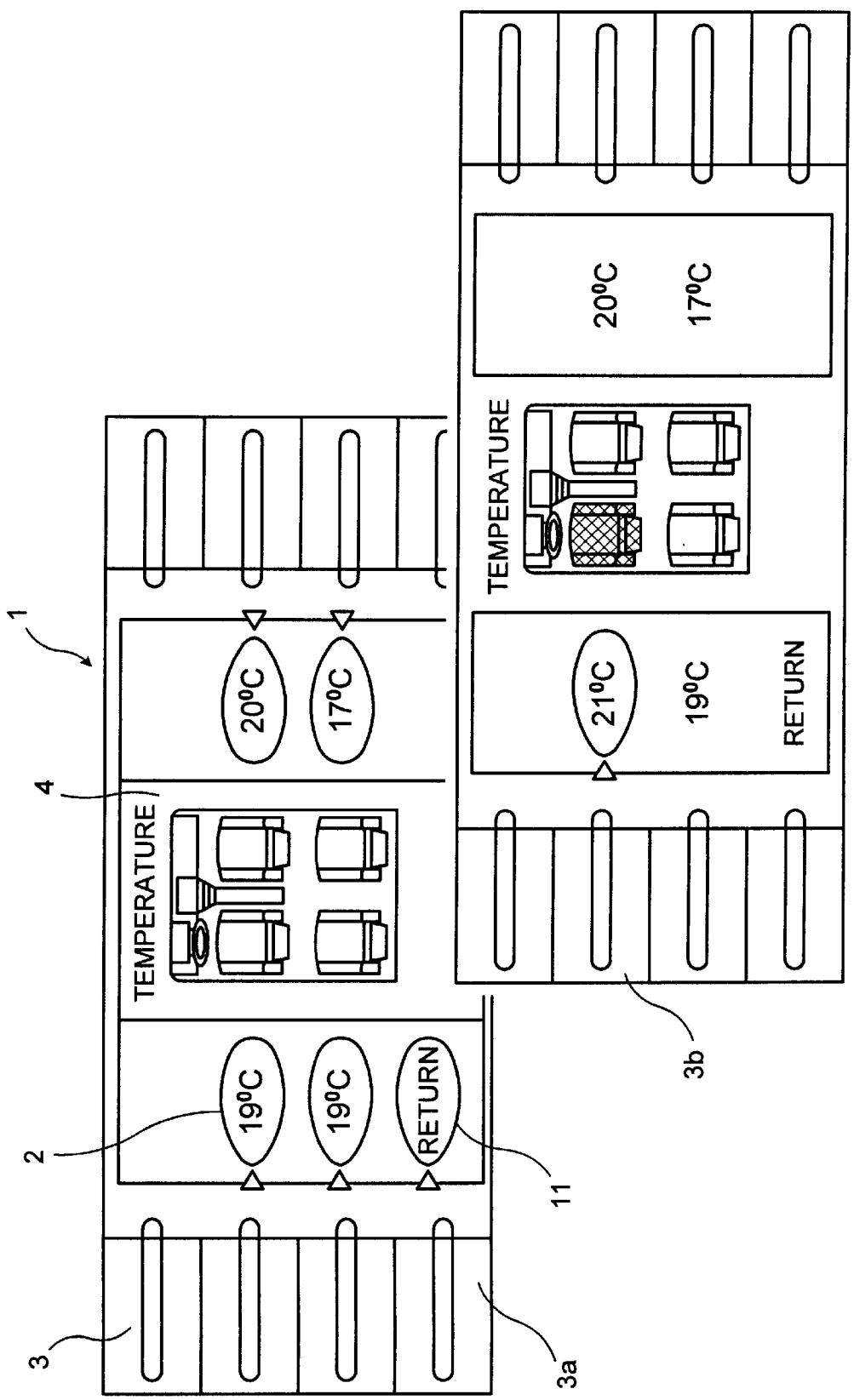
FIG. 1, is an illustration of the display and control device according to the invention in the example of a temperature setting for an air-conditioning device.

FIG. 1 shows the use of the device according to the invention for a heating and air-conditioning device of a motor vehicle. The system 1 has a display screen 2 and control elements 3 arranged at the periphery of the screen, which preferably are designed as control keys. A first information display 4 is shown in a central portion of the display 2, so that corresponding displays, functions and/or status displays assigned to the control elements 3 can be generated and displayed in the remaining second portion of the display screen 2a, 2b. In the display example shown in FIG. 1, temperature data is displayed for various locations in the interior of the vehicle, showing currently set temperatures, which may be varied via the control elements 3.

The information panel 4, with its pictogram-supported representation and the heading Temperature, as well as representation of the interior, makes it clear to the driver that he can adjust the temperature setting in the interior of the vehicle individually for each seat. The corresponding assignment, of control elements 3 in spatial relation to the projection in the display field 2, and in the information panel 4, respectively immediately makes it clear that the front left display, which shows a temperature of 19° C., represents the driver's seat and the area surrounding it and that the temperature of 20° C. is assigned to the front passenger's seat. For the back seats, the temperature is 19° C. on the left side and 17° C. on the right side. The lowermost control element 3a at the left edge has a function assignment, that is represented by "Return" in the display field. A cone of light 11 may be provided to emphasize the association between a control element and a displayed function. Using this control element, it becomes quite clear, allows the driver to make a menu-driven shift to the superior function and the superior menu. Standing off to the right in FIG. 1 is a second display representation, which here is intended to show only the extent to which it differs from the first representation previously described, shown at the top toward the left. Here the driver's seat, which is represented on the information panel 4, is visually highlighted by a display characteristic, such as color, brightness or contrast. Likewise highlighted is the temperature assigned to this seat, which here is represented by 21° C. This makes it clear that the driver, using the corresponding control element 3b, has varied the temperature for this partial space within the vehicle.

Figure 2:
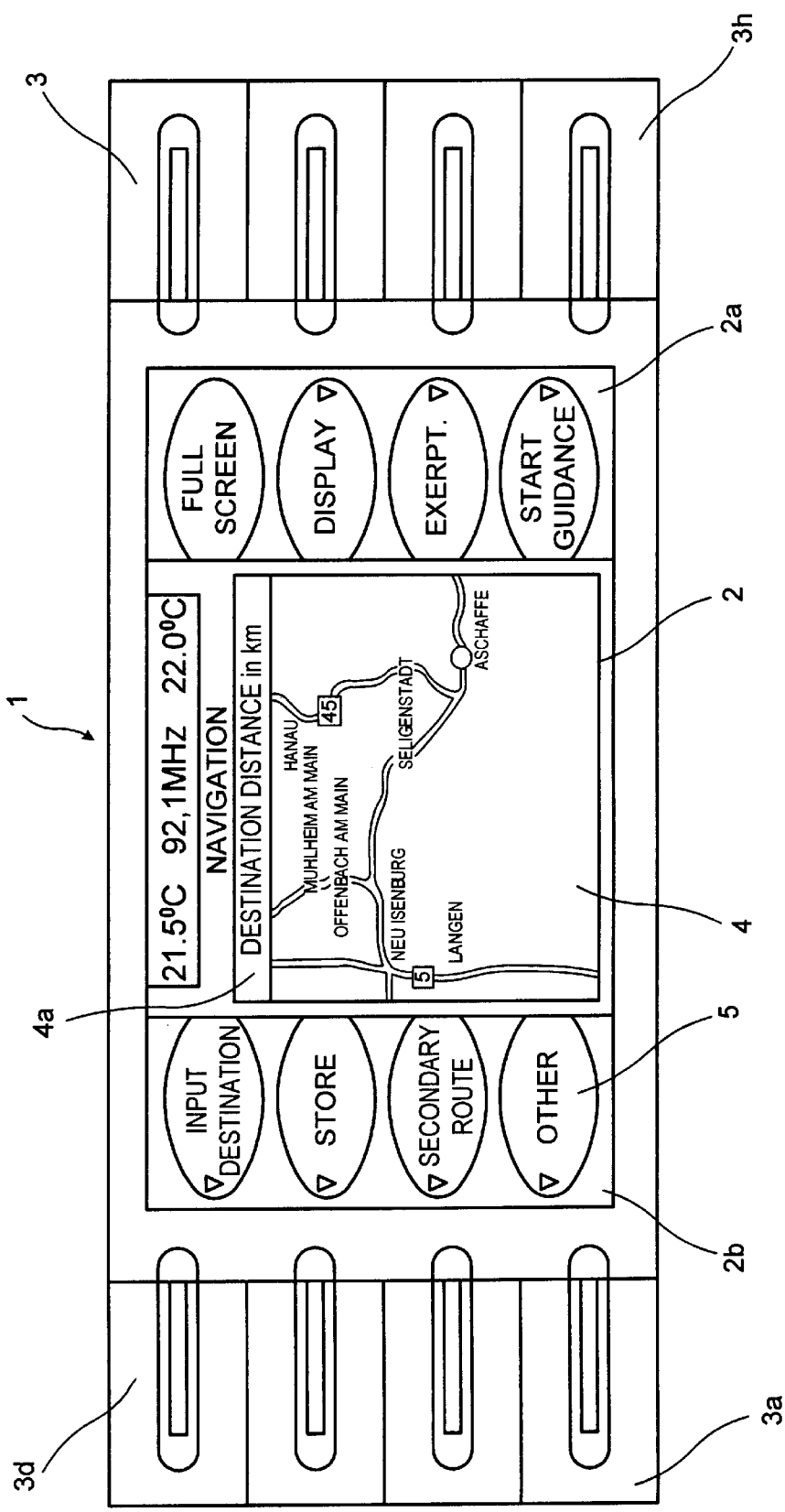
FIG. 2, shows the basic menu for a navigation device.
Figure 5:
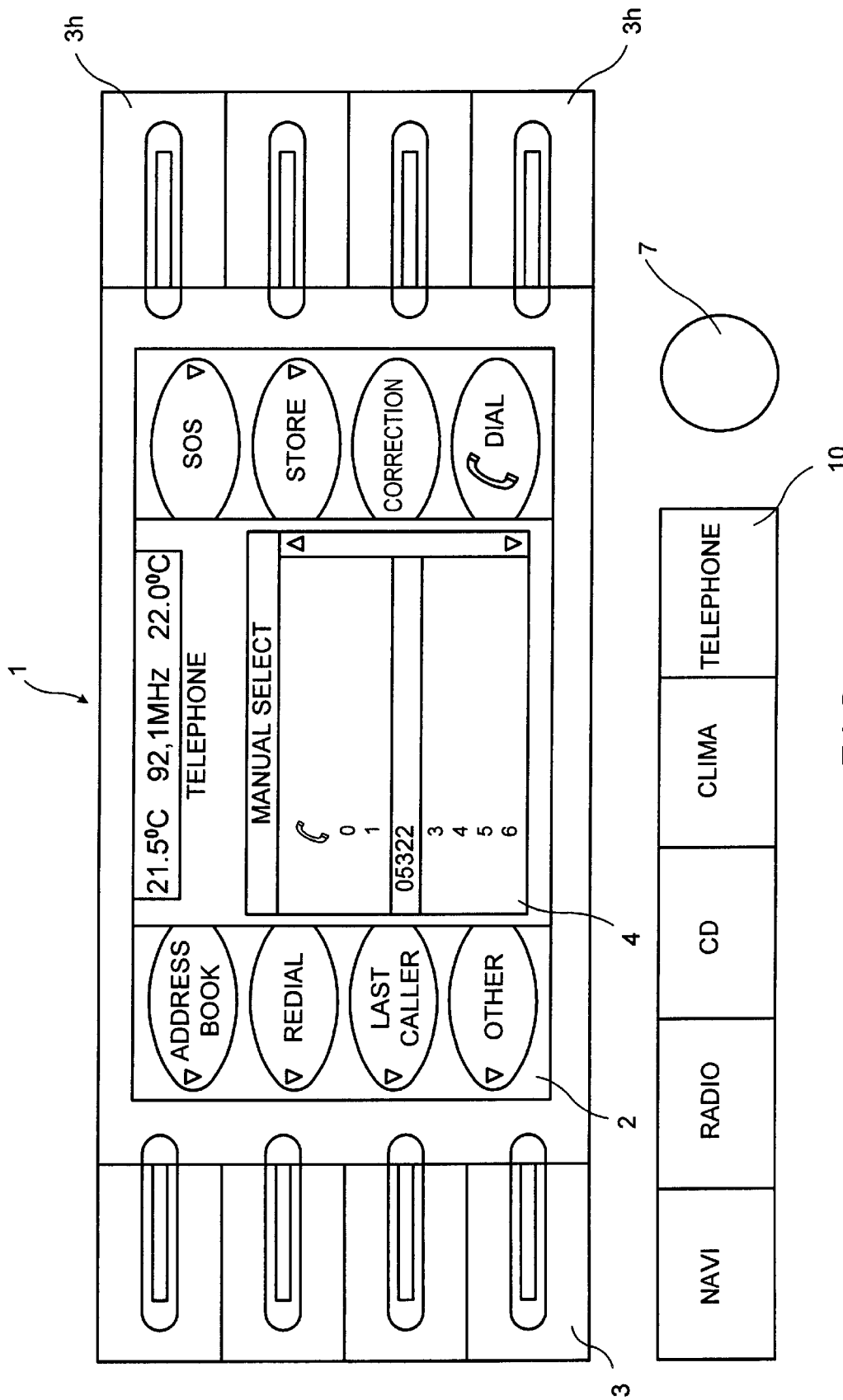
FIG. 5, shows the basic menu for a telephone device.

After selection of control of a navigation device by a permanently assigned control element, such as control element 10 shown in FIG. 5, the basic menu of a navigation device appears on the display field 2 as shown in FIG. 2. Here the information panel 4 shows a portion of a road map and the instantaneous location of the vehicle. Above the road map is a field 4a, showing the destination and the distance to the destination. If guidance is not activated, or if no destination is input, a corresponding indication is shown above it in the field 4a. Menus and functions 6, which are assigned to the respective control elements 3, are indicated in the remaining portions 2a, 2b of the display 2. An arrow 5 adjacent a function label indicates that these functions are menu items to which additional functions are assigned. The control element 3a, to which the "return" function was assigned in the display of FIG. 1, here has the function "Other," for additional secondary functions, which after actuation of the control element 3a, appear on the display fields 2a and 2b and are assigned clearly to the control elements. If the user wishes to input a new destination, he actuates control element 3d, and a display image illustrated in FIG. 3 appears.

Figure 3:
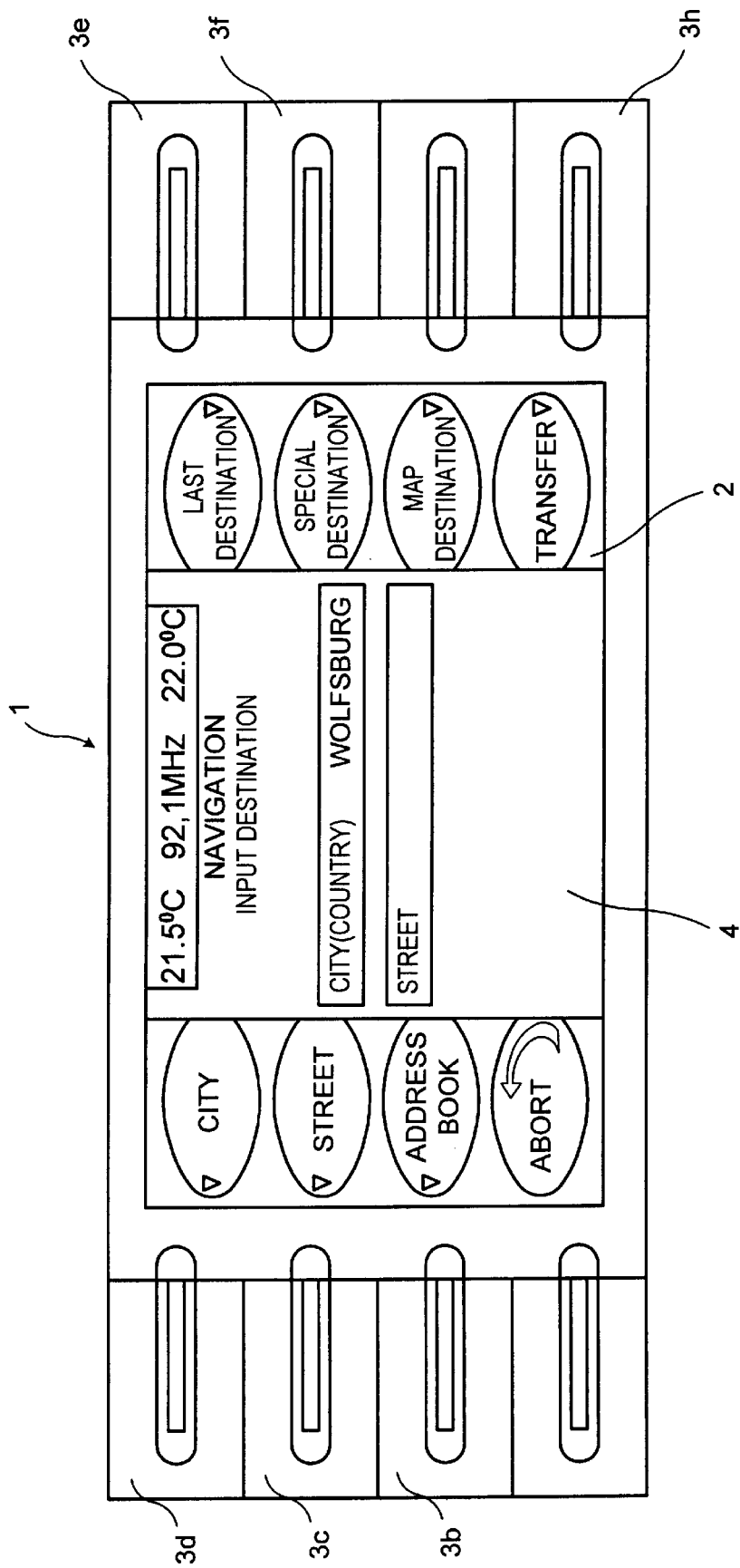
FIG. 3, shows the "destination input" menu for a navigation device.

This FIG. 3 menu makes a variety of possibilities or functions available to the user for specifying a destination for the navigation device. Thus, the destination city and the destination street can be selected manually by the user via the control elements 3d and 3e. After the corresponding input the information entered appears on the information panel 4 of the display field 2. The control elements 3b, 3e or 3f may be used to select stored destinations from various memories of the navigation device. If the user actuates the control element 3h, the selected destination is transferred to the navigation device and the display and control device 1 jumps back into the basic menu of FIG. 2, from which the user can start guidance by pressing the control element 3h.

Figure 4:
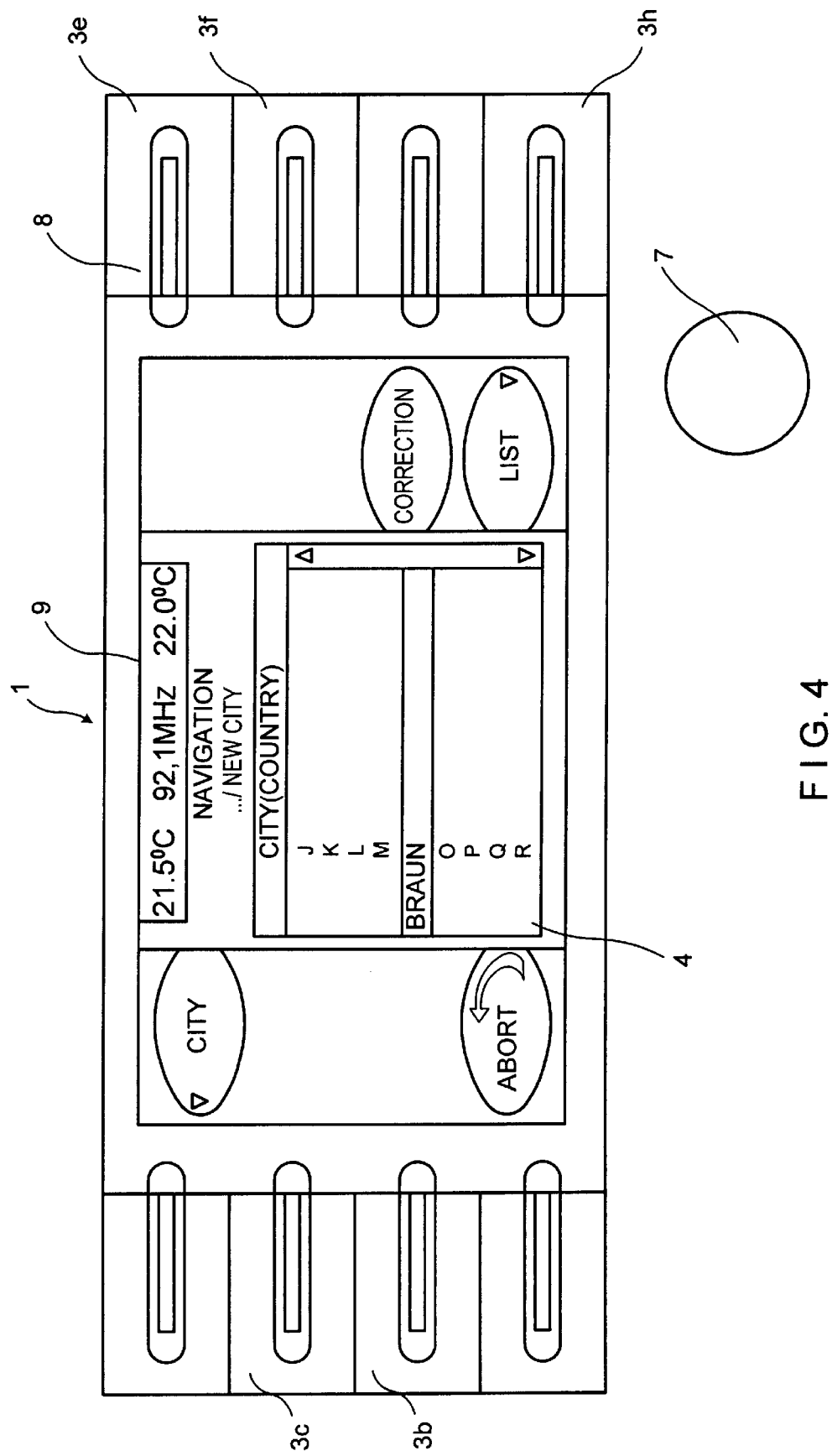
FIG. 4, shows the "destination input-city" menu for a navigation device.

FIG. 4 presents the menu selection of the display and control device for manual input of a city after the user has actuated the control element 3d in the menu item of FIG. 3. In this menu the control elements 3b, 3c and 3e, 3f are not assigned, which is signaled by a function display, not present, in the display field 2. In addition, this may alternatively be signaled by an off-status lighting means 8 on the control elements. The name of the city is input by means of the display on the information panel 4 and a rotary knob 7 by way of a so-called speller function, which is described for example in the assignee's patent application DE 198 27 753.

In FIG. 4 the information panel 4 additionally has an information field 9, in which information pertaining to other menus or features is displayed. Thus, the tuned frequency of a radio receiver or transmitter, and the set interior temperatures of the air-conditioning unit are indicated here. If the user now wishes for example to make a telephone call from a menu of the navigation device, he may actuate a permanently assigned control element 10 for the telephone device (FIG. 5) and the basic menu of the telephone device appears on the display and control device 1, whereupon functions 6 of this device are now assigned to the control elements 3 by way of the display fields 2a, 2b. By means of the display on the information panel 4 and the rotary knob 7, a telephone number may for example be input manually. If the user, after inputting the telephone number in fall, presses the control element 3h, this telephone number is automatically dialed by the telephone device.

Figure 6:
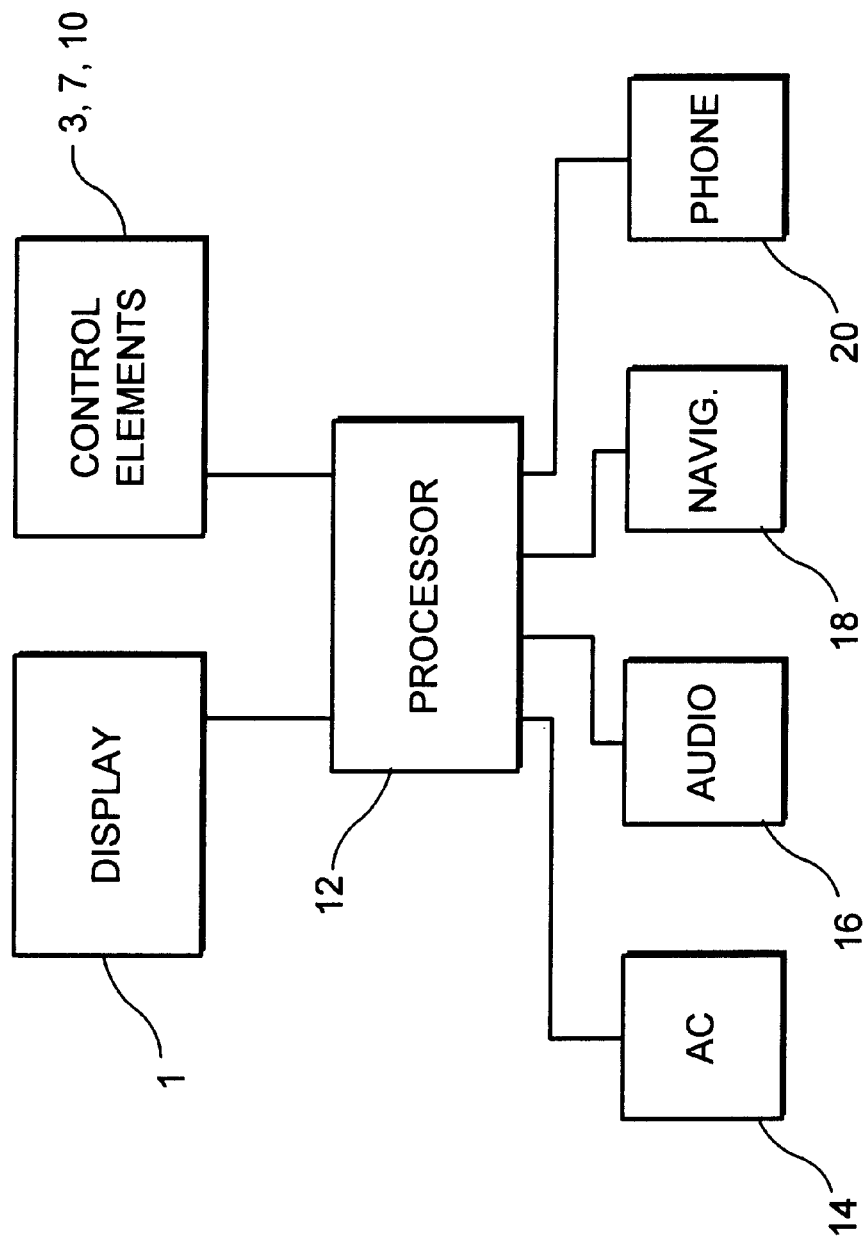
FIG. 6 is a block diagram showing the display and control system of the invention.

FIG. 6 is a block diagram showing the arrangement of the display and control device and its interconnection to devices being controlled. The system includes the display screen 2 and one or more control elements 3, 7, 10. The control elements are connected to provide control signals to a processor 12 which generates the display screens according to received control signals and other data using a display control program. Processor 12 is connected to receive data from other systems and to provide control signals thereto. As shown in FIG. 6, processor 12 is connected to air conditioner system 14, audio system 16, navigation system 18 and telephone 20.

While there has been described what are believed to be the preferred embodiments of the present invention, those skilled in the art will recognize that other and further changes and modifications may be made thereto without departing from the spirit of the invention, and it is intended to claim all such changes and modifications as fall within the true scope of the invention.

We claim:

1. A method for operating a display and control device for controlling operation of a plurality of devices in a motor vehicle, comprising:

providing a display screen having a periphery;

providing first fixed function control elements for selection of a device from said plurality of devices;

providing second variable function control elements arranged near said periphery of said display;

providing a first information display, said information display being on a first portion of said display screen, less than said total display area of said screen, and said information relating to a device selected using said first control elements;

assigning functions to at least some of said second control elements, said functions relating to said selected device; and displaying the said assigned functions on at least one second portion of said display screen, said second portion adjoining said assigned second variable function control elements, and said assigned functions being displayed in positions which spatially correspond to said second control elements.

2. A method according to claim 1, wherein said first information display is provided in a contrasting display format to said assigned function display.

3. A method according to claim 1, wherein at least one of said assigned functions is displayed in a position having a spatial relation to corresponding displayed elements of said first information display.

4. A method according to claim 1, wherein operation of at least some of said second control elements controls said first information display.

5. A method according to claim 4, wherein said first information display displays additional information not related to a selected device.

6. A method according to claim 1, wherein a selectable function is visually highlighted on said display.

7. A method according to claim 6, wherein said displayed functions include a display of a cone of light, which has its optical origin, near the corresponding assigned control element.

8. A method according to claim 1, wherein said information display is function-linked and status-linked to said function display by variation in at least one display characteristic selected from color, brightness, contrast, and size.

9. A method according to claim 8, wherein said display characteristics have variations which are highlighted or diminished according to the importance of said function link and status link.

10. A multifunction display and control apparatus for a motor vehicle, comprising:

a display screen having a periphery first fixed function control elements for selecting a device to be controlled;

second variable function control elements arranged near said periphery of said display;

a processor connected to devices to be controlled, said display and said first and second control elements, said processor being programmed to:

provide a first information display on a first portion of said screen, less than the total area of said screen, and said information relating to a device selected using said first control elements;

assigning functions to at least some of said second control elements relating to control of said selected device;

displaying said assigned functions on at least one second portion of said display screen, said second portion adjoining said assigned second control elements and said assigned functions being displayed in positions which spatially correspond to said second control elements; and responding to operation of said first and second control elements to control a selected device.

11. Apparatus according to claim 10, wherein at least one selected function is a function for return to a superior menu.

12. Apparatus according to claim 10, wherein said first information display is provided in a contrasting display format compared to said assigned function display.

13. Apparatus according to claim 10, wherein at least one of the assigned function displays is in a selected spatial relationship with an information display in said first portion of said display screen.

14. Apparatus according to claim 10, wherein said processor provides said first display including the currently selected menu.

15. Apparatus according to claim 14, wherein said processor is further programmed to display messages relating to non-selected devices in said first information display.

16. Apparatus according to claim 10, wherein said processor is programmed to highlight portions of said information display corresponding to selected functions.

17. Apparatus as specified in claim 16, wherein said highlight portions include an apparent cone of light having its point of highest brightness near an assigned second control element.

18. Apparatus as specified in claim 10, wherein said processor is programmed to link portions of said information display and said assigned function display by variation of at least one display characteristic selected from color, brightness, contrast and size.

19. Apparatus as specified in claim 10, wherein there is provided an additional control element for performing said assigned functions.

20. Apparatus as specified in claim 10, wherein said devices to be controlled are selected from the group comprising air conditioning, audio system, telephone and navigation device.

* * * * *